United States Patent
Dimiev et al.

(10) Patent No.: US 12,534,370 B2
(45) Date of Patent: Jan. 27, 2026

(54) METHOD FOR SEPARATING CARBON NANOTUBES USING MODIFIED CELLULOSE

(71) Applicant: YAZAKI CORPORATION, Tokyo (JP)

(72) Inventors: Ayrat Maratovich Dimiev, Kazan (RU); Timur Lenarovich Khamidullin, Kazan (RU)

(73) Assignee: YAZAKI CORPORATION, Tokyo (JP)

( * ) Notice: Subject to any disclaimer, the term of this patent is extended or adjusted under 35 U.S.C. 154(b) by 791 days.

(21) Appl. No.: 17/905,248

(22) PCT Filed: Mar. 11, 2021

(86) PCT No.: PCT/US2021/021858
§ 371 (c)(1),
(2) Date: Aug. 29, 2022

(87) PCT Pub. No.: WO2021/183737
PCT Pub. Date: Sep. 16, 2021

(65) Prior Publication Data
US 2023/0094669 A1    Mar. 30, 2023

(30) Foreign Application Priority Data

Mar. 12, 2020   (RU) .......................... RU2020110383

(51) Int. Cl.
*C01B 32/172* (2017.01)
*B01D 15/42* (2006.01)
(Continued)

(52) U.S. Cl.
CPC .......... *C01B 32/172* (2017.08); *B01D 15/426* (2013.01); *B01J 20/24* (2013.01);
(Continued)

(58) Field of Classification Search
CPC ... C01B 32/172; C01B 32/159; C01B 32/174; C01B 2202/02; C01B 2202/22;
(Continued)

(56) References Cited

U.S. PATENT DOCUMENTS

| 4,714,555 A | 12/1987 | Shibata et al. |
| 7,374,649 B2 | 5/2008 | Jagota et al. |

(Continued)

FOREIGN PATENT DOCUMENTS

| CN | 102627271 A | 8/2012 |
| WO | 2015130229 A1 | 9/2015 |

OTHER PUBLICATIONS

Khamidullin, Timur, et al. "Simple, cost-efficient and high throughput method for separating single-wall carbon nanotubes with modified cotton." Carbon 178 (2021): 157-163.*

(Continued)

*Primary Examiner* — Richard M Rump
(74) *Attorney, Agent, or Firm* — PERKINS COIE LLP; Viola T. Kung (57) ABSTRACT

The present invention relates to using modified cellulose (e.g., nitrated cellulose) for separating carbon nanotubes (CNTs). A raw mixture of CNTs of different structures or chiral angles (chiralities), can be separated into fractions, based on their selective permeation through a separation column filled with nitrated cellulose. The present invention is particularly useful in separating semiconducting CNTs and metallic CNTs.

20 Claims, 5 Drawing Sheets

(51) Int. Cl.
  *B01J 20/24* (2006.01)
  *B01J 20/28* (2006.01)
  *B01J 20/288* (2006.01)
  *C01B 32/159* (2017.01)
  *C01B 32/174* (2017.01)

(52) U.S. Cl.
  CPC ....... *B01J 20/28052* (2013.01); *B01J 20/288* (2013.01); *C01B 32/159* (2017.08); *C01B 32/174* (2017.08); *B01J 2220/52* (2013.01); *C01B 2202/02* (2013.01); *C01B 2202/22* (2013.01); *C01P 2002/82* (2013.01); *C01P 2002/84* (2013.01)

(58) Field of Classification Search
  CPC ..... B01D 15/426; B01J 20/24; B01J 20/8052; B01J 20/288; B01J 2220/52; C01P 2002/82; C01P 2002/08
  See application file for complete search history.

(56) References Cited

U.S. PATENT DOCUMENTS

| | | | |
|---|---|---|---|
| 8,691,178 | B2 | 4/2014 | Forrest et al. |
| 10,173,149 | B2* | 1/2019 | Chan ...................... B01D 15/36 |
| 10,207,929 | B2* | 2/2019 | Yamagishi ............... H01B 5/02 |
| 10,858,256 | B2 | 12/2020 | Gui et al. |
| 2013/0180897 | A1 | 7/2013 | Tanaka et al. |
| 2016/0280547 | A1* | 9/2016 | Liu ......................... B01J 20/291 |
| 2017/0137291 | A1 | 5/2017 | Chan et al. |
| 2021/0269312 | A1* | 9/2021 | Tanaka .................. C01B 32/172 |

OTHER PUBLICATIONS

European Patent Office (EPO), Extended European Search Report, EP No. 21768879.5, Aug. 16, 2023, corresponding to U.S. Appl. No. 17/905,248.

Chao Ma et al. "Chiral separation of D,L-mandelic acid through cellulose membranes", Chirality, Wiley-Liss, New York, US, vol. 23, No. 5, Jan. 5, 2011 (Jan. 5, 2011), pp. 37-382, XP071747258, ISSN: 0899-0042, DOI: 10.1002/CHIR.20935.

International Search Report for PCT Application No. PCT/US2021/021858. Mail Date: Jun. 17, 2021. 2 pages.

Jozwiak, T. et al. "The use of aminated cotton fibers as an unconventional sorbent to remove anionic dyes from aqueous solutions" Cellulose; 2020; vol. 27; pp. 3957-3969.

* cited by examiner

METHOD FOR SEPARATING CARBON NANOTUBES USING MODIFIED CELLULOSE

This application is a National Stage of International Application PCT/US2021/021858, filed Mar. 11, 2021; which claims the priority of Russian Application No. 2020110383, filed Mar. 12, 2020. The contents of the above-identified applications are incorporated herein by reference in their entireties.

TECHNICAL FIELD

This invention relates to a method for separating carbon nanotubes using nitrated cellulose.

BACKGROUND

Widespread application of carbon nanotubes (CNTs) is hindered by the fact that the raw CNT product regardless of production method is a mixture of nanotubes with different structures, and respectively with different electrical properties. Some CNTs show metallic characteristics, while others exhibit semiconducting behavior. Different applications require certain types of CNTs, preferably in their isolated forms without the presence of another type. Thus, metallic CNTs (M-CNTs), due to their high electrical conductivity, can potentially be used as conductors to replace metals in wires, flexible conducting films, etc. On the other hand, semiconducting CNTs (S-CNTs), because they have a band gap, can be used as transistors, quantum dots, etc. Further, extracting S-CNTs of single chirality is even more interesting, since the mono-chiral CNTs can be used as quantum dots with a distinct and unique emission spectrum with very strong and narrow emission bands. Thus, efficient methods of separation of the raw CNT production mixtures are highly desired.

Presently, there are three most commonly used methods for separating CNTs: density gradient ultracentrifugation (DGUC), aqueous two-phase extraction (ATPE), and selective gel permeation (SGP).

DGUC is based on the differences in the buoyant densities of the surfactant-assembled CNTs of different structures. During the centrifugation, the surfactant wrapped CNTs precipitate through the high density liquids such as iodixanol, with the predesigned density gradient (www.doi.org/10.1038/nnano.2006.52). The method is good for research purposes, since it allows one to obtain more than two fractions of CNTs, including the fractions of single chirality. However, this method cannot be scaled up, and it is very expensive for industrial scale usage. Firstly, because it is limited by the capacity of the ultra-centrifuge tubes/bottles. Secondly, being ultracentrifuge-based, it is highly energy consuming. Thirdly, it is very difficult to extract the separated CNTs from the density-gradient liquids without sacrificing the latter.

ATPE is based on selective extraction of certain CNTs from a dispersion in a blend of two partially miscible polymers such as dextran and polyethylene glycol. When the solution of the two blended polymers separates into two phases upon standing or centrifugation, the CNTs present in the mixture are pulled toward the two different phases, based on their structure (Nano Lett., 2015, 15, 1642-1646). The method is efficient and scalable; however, it has a significant drawback in that it is very difficult to extract CNTs from the polymer solutions.

SGP is based on selective permeation of surfactant-wrapped CNTs of different chiralities, through a column filled with the gels of several polysaccharides such as agarose and dextran. The method is described in a series of publications (Nano Lett. 2009, 9, 1497-1500; Nature Commun. 2011, DOI: 10.1038/ncomms1313; Nano Lett. 2013, 13, 1996-2003). The gels used for separation are commercial products, for example, sold under the trade names "Sepharose" and "Sephacryl". The cost of these products is more than $1000/L. This method can be easily scaled-up, however the high cost of the gels used for the separation is a serious drawback. Another shortcoming is the relatively low flow rate of the CNT dispersion through the column filled with these gels.

There exists a need for a new method for separating M-CNTs from S-CNTs, which should be suitable for scale-up to an industrial level, and should be cost-efficient.

DETAILED DESCRIPTION OF THE INVENTION

The present invention relates to using modified cellulose (MC) for separating carbon nanotubes (CNTs). The inventors have discovered that by using modified cellulose, in particular, nitrated cellulose, a raw mixture of CNTs of different structures or chiral angles (chiralities), can be separated into fractions, based on their selective permeation through a separation column filled with modified cellulose (MC).

"Modified cellulose" refers to cellulose that has chemical modifications on the hydroxyl groups in the cellulose backbone. There are primary and secondary hydroxyl groups in each cellulose unit, where the C6-hydroxyl group (—CH$_2$OH) exhibits a higher reactivity than other C2 and C3 hydroxyl groups.

Figure 1:
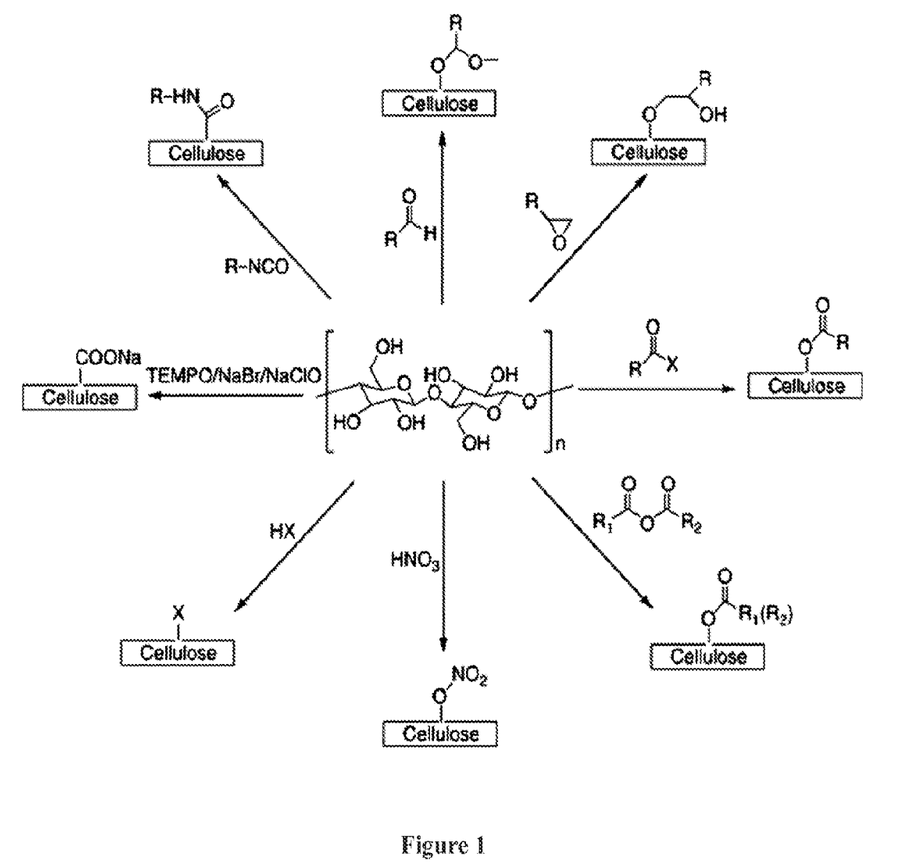
FIG. 1. Examples of Modified Cellulose. Hydroxyl groups are modified by oxidation, esterification, etherification, urethanization, amidation, and non-covalent modifications.

FIG. 1 shows some examples of modified cellulose, where hydroxyl groups are modified by oxidation, esterification, etherification, urethanization, amidation, or non-covalent modifications.

Figure 2:
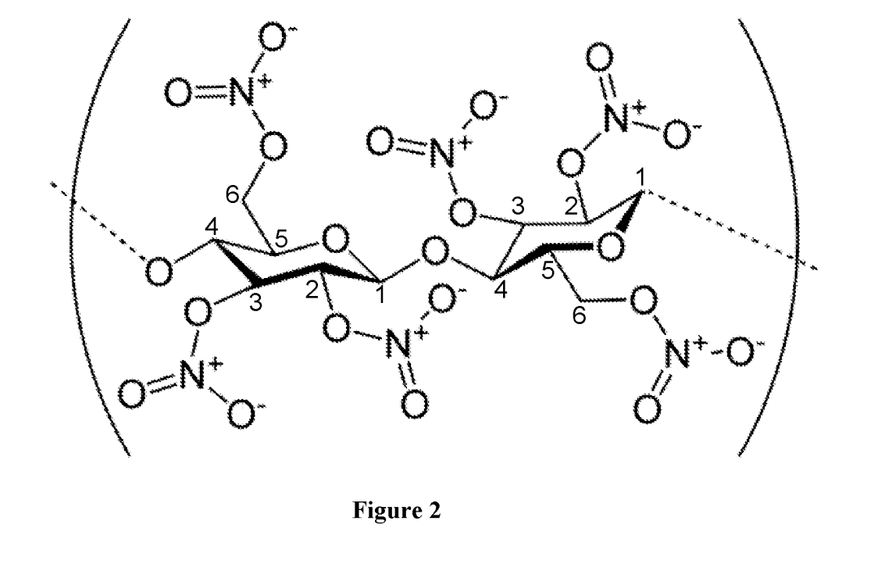
FIG. 2. Examples of Modified Cellulose. Hydroxyl groups are modified by nitration.

FIG. 2 shows another example of modified cellulose, where the modified cellulose is nitrated cellulose in which the hydrogens in hydroxyl groups of the cellulose are modified to contain nitro ($-NO_2$) functional groups. Although FIG. 2 shows all the hydrogens of the hydroxyls in the C2, C3, and C6 positions replaced by nitro groups, nitrated cellulose useful for the present invention is preferably not fully nitrated in all the available positions. The nitrated cellulose useful in the present invention in general contains about 1-15% by weight of nitrogen, preferably about 2-12% or about 3-11% by weight of nitrogen, and more preferably about 5-9%, or about 5-7%, or about 6-7% by weight of nitrogen. The about 6-7% by weight of nitrogen in the modified cellulose corresponds to the molecular formula $C_{24}H_{36}O_{16}(NO_3)_4$.

The nitration of cellulose can be conducted by immersing cellulose in nitric acid or in a solution containing nitric acid, for example, in a mixture of nitric and sulfuric acids. An intended nitration level in the modified cellulose (MC) may be achieved by controlling basic reaction parameters such as: $HNO_3/H_2SO_4$ ratio, acids/cellulose ratio, reaction temperature, and time of reaction.

"About" as used in this application, refers to ±10% of the recited value.

The present invention is directed to a method for separating CNTs from a mixture containing different structures or different chiral angles (chiralities) of CNTs, based on their selective permeation through MC. The method comprises the steps of: (a) dispersing a mixture of CNTs in a dispersing solution to form a CNT dispersion, (b) passing the CNT dispersion through a column packed with modified cellulose such as nitrated cellulose, (c) eluting a first kind of CNTs with a first aqueous solution comprising a first surfactant, and (d) eluting a second kind of CNTs with a second aqueous solution comprising a second surfactant. The first aqueous solution and the second aqueous solution are different in order to elute different structures of CNTs. In one embodiment, the first surfactant and the second surfactant are different. In another embodiment, the concentrations of the first surfactant and the second surfactant are different. In general, the second aqueous solution is stronger than the first aqueous solution in terms of the ability to elute the bound CNTs off the modified cellulose. Optionally, additional elution steps can be made between steps (c) and (d) with a mixture of first and second surfactants at different ratios. In this way, CNT fractions may be obtained having a greater degree of structural homogeneity.

In step (a), the CNT mixture is dispersed in a dispersing solution to form a CNT dispersion. "Dispersing", as used herein, is forming a stable suspension of CNTs. A stable suspension is one in which no visible carbon powder, particles, flakes, or loose agglomerates precipitate out of the solution or settle to the bottom of the mixture, when the suspension is left undisturbed. Typically, to disperse the CNT mixture, the mixture is mechanically agitated by one or more standard methods that can include stirring, sonication, microfluidization, wet grinding, etc. In one embodiment, the dispersing solution comprises one or more surfactants to unbundle CNTs. Preferably, the one or more surfactants are anionic surfactants. For example, the one or more anionic surfactants are cholates, deoxycholates, sulfates, sulfonates, phosphates, phosphonates, carboxylates, and any combinations thereof. Preferred anionic surfactants for dispersing CNTs are dodecyl sulfate, sodium cholate, sodium deoxycholate, sodium dodecyl benzene cholate, or any combinations thereof.

Optionally, between step (a) and step (b), the CNT mixture may be centrifuged to remove un-dispersed CNT bundles or particles, and the supernatant CNT dispersion used in subsequent steps (b)-(d).

In step (b), the CNT dispersion is loaded on the top of a column packed with modified cellulose, and passed through the column. The CNT dispersion may be used directly as a loading solution and loaded onto the column directly. Alternatively, the CNT dispersion may be mixed with another aqueous solution to prepare a loading solution before loading onto the column. The another aqueous solution may optionally contain an anionic surfactant.

Step (b) may be varied by pre-mixing the CNT dispersion with modified cellulose to allow adsorption of CNTs with MC, and then packing the CNT/MC mixture in a column.

In step (c), a first kind of CNTs is eluted with a first aqueous solution comprising a first surfactant. In one embodiment, the CNT dispersion of (a) contains the same first aqueous solution of step (c), and thus the first kind of CNTs does not bind to, or adsorb to MC in step (b) and it flows through the column in a void volume. In another embodiment, the CNT dispersion of (a) does not contain the same first aqueous solution, and the first kind of CNTs either binds to, or adsorbs to MC in step (b), and it is eluted by the first aqueous solution in step (c).

In step (d), a second kind of CNTs is eluted with a second aqueous solution comprising a second surfactant. The first surfactant and the second surfactant are different such that the first kind of CNTs and the second kind of CNTs are eluted separately by different surfactants. Preferably, the second aqueous solution is stronger than the first aqueous solution in terms of its ability to elute the remaining CNTs bound to the nitrated cellulose. In one preferred embodiment, the first kind of CNTs is semiconducting CNTs (S-CNTs) and the second kind of CNTs is metallic CNTs (M-CNTs). The method separates S-CNTs and M-CNTs by eluting them with different first and second surfactants.

In another embodiment, the first kind of CNTs is M-CNTs, and the second kind of CNTs is S-CNTs. The method separates M-CNTs and S-CNTs by eluting them with different first and second surfactants.

In one embodiment, the cellulose is natural cotton.

In another embodiment, the cellulose is any textile made from natural cotton, either woven or non-woven.

In another embodiment, the cellulose is natural linen, or any woven or non-woven textile made from natural linen.

In another embodiment, the cellulose is any other natural fibrous material.

In one embodiment, the CNTs in the CNT mixture are single-walled CNTs, double-walled CNTs, or multi-walled CNTs. Preferred CNTs are single-walled CNTs.

In one embodiment, the first and the second surfactants are anionic surfactants independently selected from the group consisting of: cholates, deoxycholates, sulfates, sulfonates, phosphates, phosphonates, carboxylates, and any combinations thereof. For example, the first and the second surfactants are independently selected from the group consisting of, but not limited to: sodium dodecyl sulfate, sodium cholate, sodium deoxycholate, sodium dodecyl benzene cholate, and any combinations thereof.

In one embodiment, the dispersing solution that disperses CNTs is an aqueous solution containing a surfactant such as an anionic surfactant selected from the group consisting of: cholates, deoxycholates, sulfates, sulfonates, phosphates, phosphonates, carboxylates, and any combinations thereof. For example, the anionic surfactant is sodium dodecyl sulfate, sodium cholate, sodium deoxycholate, sodium dodecyl benzene cholate, or any combination thereof.

The separation of CNTs occurs, when a CNT dispersion in solution is passed through a column packed with MC, and eluted consecutively with solutions of specific surfactants. For example, S-CNTs may be eluted in a first fraction with a solution of sodium dodecyl sulfate (SDS) and M-CNTs may be eluted in a second fraction with sodium deoxycholate (SDC).

Further elution steps may be added with different concentrations of the same surfactants and their mixtures in different ratios to allow separation of CNTs for a narrow set of selected chiralities.

Different pH and ionic strength can be used in the dispersing solution and in the elution solutions to optimize the CNT separation.

Different permutations of surfactants and surfactant concentrations can be optimized in the present invention. In one embodiment, the initial dispersion solution contains SDC at 0.4-5 wt %, or 0.5-2 wt % to disperse CNTs. The dispersion solution is then adjusted to a mixture of 0.2-2 wt % SDS and 0.02-0.3 wt % SDC before loading onto a MC-packed column. S-CNTs are eluted with a first aqueous solution comprising 0.5-5 wt % or 1-2 wt % SDS (e.g., 1 wt % SDS). Then M-CNTs are eluted with a second aqueous solution comprising 0.5-5 wt % or 1-3 wt % SDC (e.g., 2 wt % SDC). In this embodiment, an optional elution step may be added after the first elution step and before the second elution step. The optional elution step uses a combination of SDS and SDC surfactants with each surfactant concentration lower than that in the first or the second aqueous solution. This additional step may elute M-CNTs with different chiralities.

In another embodiment, the initial dispersion solution contains 0.5-5 wt %, or 0.5-2 wt % SDS (e.g., 1 wt % SDS) without any SDC. First, M-CNTs are eluted with a first aqueous solution comprising 0.5-5 wt % or 1-2 wt % SDS (e.g., 1 wt % SDS). Then, S-CNTs are eluted with 0.5-5 wt % or 1-2 wt % SDC (e.g., 1 wt % SDC). In this embodiment, the lack of SDC in the initial dispersion solution causes the sequence of elutions to be reversed, when compared with the embodiment described above in which the initial dispersion solution contains both SDS and SDC. That is, in this embodiment M-CNTs are eluted first and S-CNTs second, whereas in the previously described embodiment S-CNTs are eluted first, followed by M-CNTs.

The present method is robust, environmentally-friendly, cost-effective, and suitable for large-scale production. MC is inexpensive. Also, after the separation, the packed column can be re-used for at least 20 more cycles for separation of CNTs.

The present method is useful to separate CNTs from commercially available CNTs that are produced in high volume, such as single-walled CNTs sold under the trade name TUBALL™ by OCSiAl, Luxembourg.

The following examples further illustrate the present invention. These examples are intended merely to be illustrative of the present invention and are not to be construed as being limiting.

EXAMPLES

Example 1. Preparation of Modified Cellulose (MC)

A nitrating mixture was prepared by blending 200 mL nitric acid (65%) and 600 mL sulfuric acid (95-96%). The mixture was cooled to 22° C. Cotton wool (30.0 g, purchased at a local pharmacy) was immersed into the acid mixture, and agitated manually with a glass rod. The reaction temperature was maintained at 22-23° C. In 6 min, the cotton wool was removed from the acid and placed on a Buchner funnel to drain the acid from the cotton wool. Then, the cotton wool was transferred to the glass container, filled with 3 L of cold water to quench the reaction. Then the cotton wool was placed on the Buchner funnel again to drain the washing water from the cotton wool. Such washing cycles were repeated several times until the washing waters become neutral based on pH indicating paper. After the final washing, the cotton wool was squeezed by hand to remove as much water as possible, and placed on a shelf to dry at ambient conditions. The yield of reaction was 36.18 g, i.e. 6.18 g weight gain due to the nitration. This procedure yielded modified cellulose (MC) in the form of modified cotton wool.

Figure 3:
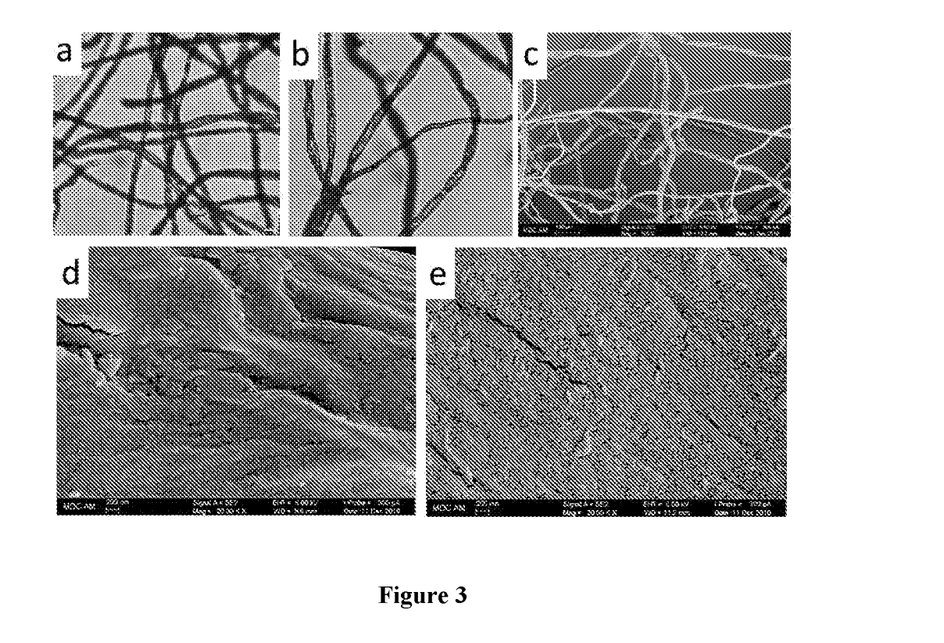
FIG. 3. Microscopy images of the original and modified cotton: Optical microscopy images of (a) original and (b) modified cotton; (c) low-magnification SEM image of modified cotton; (d) high-magnification SEM image of the original cotton; and (e) high-magnification SEM image of modified cotton.

The MC appeared very much the same as the original cotton. As evident from FIG. 3 (a, b, c), The MC retained its fibrous structure. The only notable impact of the nitration was the formation of pores, visible in the higher magnification SEM images (FIG. 3, d, e).

The as-prepared MC (32 g) was introduced into a glass tube, to be used as a separation column.

Example 2. Preparation of CNT Dispersion

The CNT dispersion for separation was prepared as follows. 40 mg TUBALL™ CNTs, purified from metal catalyst, were dispersed in a formulation consisting of 40 mL 1% SDC solution (sodium deoxycholate) in deionized water, and sonicated with a tip sonicator (Sonic-Vibra 750) for 3 hr with amplitude 30%. Then, 160 mL 1% SDS solution in deionized water were added to the CNT dispersion in SDC and sonicated 1 hr under the same conditions. During this step, CNTs debundled to a significant extent, yielding individual CNTs and small bundles. After sonication, the solution (containing 0.8% SDS and 0.2% SDC) was centrifuged for 12 hr at 24,000 RPM (60000 g) and T=25° C. to precipitate the remaining bundles. The supernatant (SN, top 80% of the solution in the centrifuge tube) was sampled out and loaded on the MC-packed column for separation.

Example 3. Separation of CNTs into S-CNTs and M-CNTs

The separation column packed with MC from Example 1 was secured in a vertical orientation. Then, 32.8 mL of the supernatant CNT Dispersion from Example 2 were poured into the top of the column. Then, the column was eluted with 1% SDS aqueous solution and the solution containing CNTs, exiting the bottom of the column, was collected. Elution with 1% SDS continued until no CNTs were observed in the solution coming out from the column. This collected portion of the CNT solution constituted the first fraction (Fr-1). Then, the column was eluted with a 2% SDC aqueous solution, and the exiting solution was collected again until no CNTs were observed in the solution coming out of the column. Thus, the second fraction was collected (Fr-2). The first fraction (eluted with 1% SDS) had a distinct red color, and contained mostly semiconducting CNTs (S-CNTs). The second fraction (eluted with 2% SDC) had a distinct green color, and contained mostly metallic CNTs (M-CNTs). These procedures constitute a full separation cycle.

Figure 4:
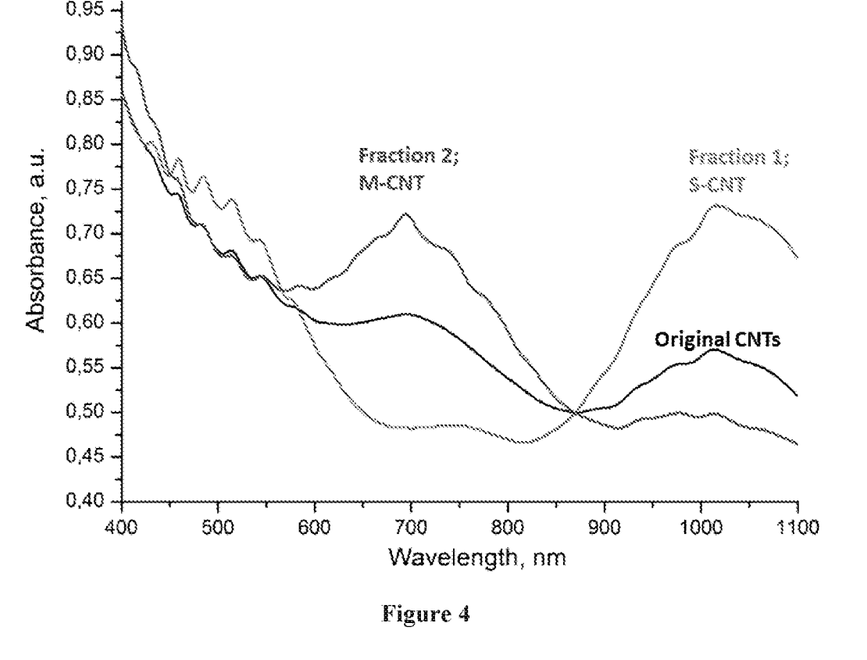
FIG. 4. The optical absorbance spectra of the two separated fractions, as compared to the spectrum of the original non-separated CNTs. The spectra are normalized to bring the absorbance to the same value at 870 nm.

FIG. 4 shows the optical absorbance spectra in the wavelength range of ~400-1100 nm of Fraction 1 (S-CNTs) and Fraction 2 (M-CNT), as compared to the spectrum of the original non-separated CNTs.

Fraction 1 absorbs in the 870 nm-1100 nm spectral region, which is associated with the S22 transitions of semiconducting CNTs (www.doi.org/10.1103/PhysRevB.66.045411). Fraction 2 absorbs in the 580 nm-870 nm region, which is associated with the M11 transitions of metallic CNTs (ibid). Fraction 2 exhibits a slight, but very low absorbance in the 870 nm-1100 nm region, suggesting the presence of some S-CNTs in the fraction. However, based on the spectrum, S-CNT content is very low. Fraction 1 has almost no absorbance in the 580 nm-870 nm region, suggesting that it contains almost entirely S-CNTs. Table 1 provides the mass percentages of the CNTs in the separated fractions.

TABLE 1

The CNT content in the original solution and separated fractions, Example 3.

| Solution Type | Eluent | Mass of CNTs, mg | Percentage of CNTs, % |
|---|---|---|---|
| Original solution |  | 1.90433 | 100 |
| Fraction 1 (S-CNT) | 1% SDS | 0.59710 | 31.36 |
| Fraction 2 (M-CNT) | 2% SDC | 0.95768 | 50.29 |
| CNTs trapped in the column |  | 0.34955 | 18.35 |

Figure 5:
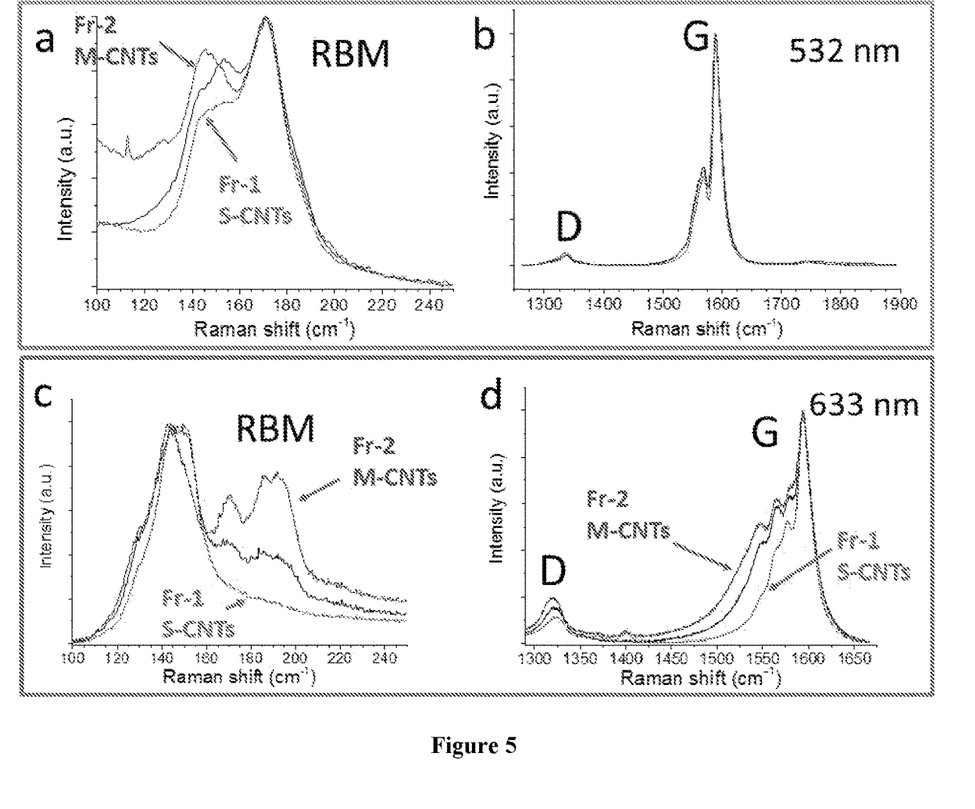
FIG. 5. Raman spectra acquired from CNTs of the two fractions and from the original CNTs as the reference sample. Spectra for M-CNTs are shown by blue lines and those of S-CNTs by red lines. Spectra for original CNTs are shown by black lines. (a, b) acquired with the 532 nm excitation laser. (c, d) acquired with the 633 nm excitation laser. (a) and (c) show the radial breathing mode (RBM) bands; (b) and (d) show the tangential mode bands, commonly referred to as the G and D bands.

FIG. 5 represents the Raman spectra, acquired from CNTs of the two fractions, and from the original CNTs as the reference sample. The radial breathing mode (RBM) bands clearly show that the spectrum of the original CNTs is the algebraic sum of the two fractions. When the Raman spectra are acquired with a 532 nm excitation laser, the G-bands of the two fractions are similar (3b). When the Raman spectra are acquired with a 633 nm excitation laser, the G-bands of the two fractions are different (3d). The M-CNTs have an additional component at 1540 cm$^{-1}$, and a shoulder at ~1520 cm$^{-1}$, which are not present in the spectrum of S-CNTs. The G-band broadening is a phenomenon specific to metallic CNTs only. Thus, the Raman spectra additionally confirm the metallic and semiconducting character of the two separated fractions.

Example 4. Separation of CNTs into S-CNTs and M-CNTs

The CNT dispersion was prepared as described in Example 2, except CNTs from a different TUBALL production batch were used in this Example. This different batch had slightly different content of CNTs, i.e. CNTs with different structures (chiralities), which is apparent from the optical absorbance spectrum (FIG. 6).

The separation column packed with MC from Example 1 was secured in a vertical orientation. Then, 30 mL of the CNT dispersion (containing 0.8% SDS and 0.2% SDC) was poured into the top of the column. Then, the column was eluted with 1% SDS aqueous solution and the solution containing CNTs, exiting the bottom of the column, was collected. Elution with 1% SDS continued until no CNTs were observed in the solution coming out from the column. This collected portion of the CNT solution constituted the first fraction (Fr-1). Then, the column was eluted with an aqueous solution, containing a combination of SDC and SDS (solution was prepared by mixing 6 volume parts of 1% SDC and 4 volume parts of 1% SDS, i.e. in the solution volume ratio 60%/40%). This collected portion of the CNT solution constituted the second fraction (Fr-2). Finally, the column was eluted with the 1% SDC solution to obtain the third fraction (Fr-3). These procedures constitute a full separation cycle.

Figure 6:
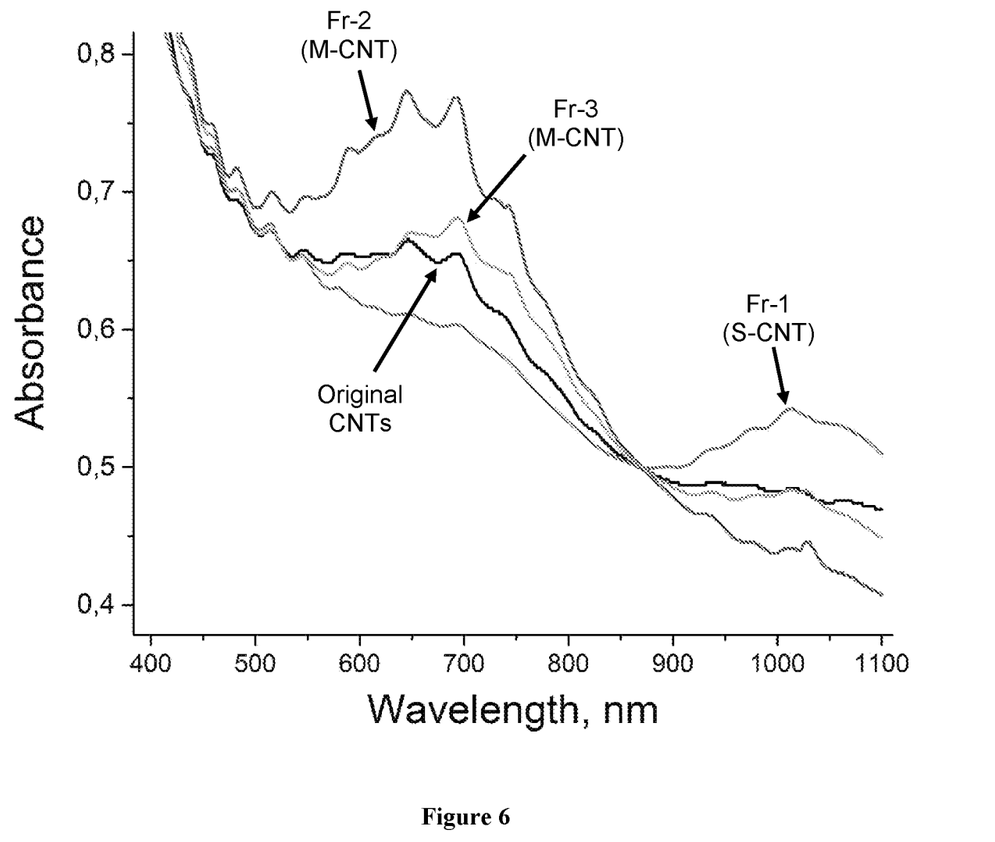
FIG. 6. The UV-Vis spectra for the three collected fractions, described in Example 4.

The optical absorbance spectra for the three collected fractions are shown in FIG. 6 in comparison to the spectrum of the original CNTs. The spectra for all the three fractions were different from each other, suggesting different types of CNTs constituting each fraction. The first fraction (eluted with 1% SDS) had a reddish tint, and was enriched with semiconducting CNTs (S-CNTs). The second fraction (eluted with the 6/4 mixture of SDC/SDS) had a distinct bluish-green color, and contained mostly metallic CNTs (M-CNTs). The third fraction had a greenish-gray color, and contained mostly M-CNTs with some S-CNTs.

Table 2 provides the mass percentages of the CNTs in the separated fractions.

TABLE 2

The CNT content in the original solution and separated fractions, Example 4.

| Solution Type | Eluent | Mass of CNTs, mg | Percentage of CNTs, % |
|---|---|---|---|
| Original solution |  | 2.0770 | 100 |
| Fraction 1 (S-CNT) | 1% SDS | 0.8371 | 40.30 |
| Fraction 2 (M-CNT) | 1% SDC/ 1% SDS = 6/4 | 0.3483 | 16.77 |
| Fraction 3 (M-CNT) | 1% SDC | 0.6557 | 31.57 |
| CNTs trapped in the column |  | 0.2359 | 11.36 |

It is to be understood that the foregoing describes preferred embodiments of the present invention and that modifications may be made therein without departing from the scope of the present invention as set forth in the claims.

What is claimed is:

1. A method for separating metallic CNTs (M-CNTs) from semiconducting CNTs (S-CNTs) in a mixture of carbon nanotubes (CNTs), comprising the steps of:
    dispersing the mixture of CNTs in a solution to form a CNT dispersion,
    passing the CNT dispersion through a column packed with nitrated cellulose,
    eluting S-CNTs with a first aqueous solution comprising a first surfactant, and
    eluting M-CNTs with a second aqueous solution comprising a second surfactant,
    wherein the first aqueous solution and the second aqueous solution are different.

2. The method according to claim 1, wherein the first surfactant and the second surfactant are different.

3. The method according to claim 1, wherein the cellulose is cotton.

4. The method according to claim 1, wherein the nitrogen content in the nitrated cellulose is from 2 to 12 wt %.

5. The method according to claim 1, wherein the nitrogen content in the nitrated cellulose is from 5 to 9 wt %.

6. The method according to claim 1, wherein the M-CNTs and S-CNTs are single-walled CNTs.

7. The method according to claim 1, wherein the dispersing solution comprises one or more dispersing surfactants.

8. The method according to claim 7, wherein the one or more dispersing surfactants are anionic surfactants.

9. The method according to claim 8, wherein the anionic surfactants are selected from the group consisting of: cholate, deoxycholates, sulfates, sulfonates, phosphates, phosphonates, carboxylates, and any combinations thereof.

10. The method according to claim 9, wherein the anionic surfactants are selected from the group consisting of: sodium dodecyl sulfate, sodium cholate, sodium deoxycholate, sodium dodecyl benzene cholate, and any combinations thereof.

11. The method according to claim 1, wherein the first and the second surfactants are different and are selected from the group consisting of: deoxycholates, sulfates, cholates, sulfonates, phosphates, phosphonates, carboxylates, and any combinations thereof.

12. The method according to claim 11, wherein the first and the second surfactants are different and are selected from the group consisting of: sodium dodecyl sulfate, sodium cholate, sodium deoxycholate, sodium dodecyl benzene cholate, and any combinations thereof.

13. A method for separating metallic CNTs (M-CNTs) from semiconducting CNTs (S-CNTs) in a mixture of carbon nanotubes (CNTs), comprising the steps of:
   dispersing the mixture of CNTs in a solution to form a CNT dispersion,
   passing the CNT dispersion through a column packed with nitrated cellulose,
   eluting M-CNTs with a first aqueous solution comprising a first surfactant, and
   eluting S-CNTs with a second aqueous solution comprising a second surfactant,
   wherein the first aqueous solution and the second aqueous solution are different.

14. The method according to claim 13, wherein the first surfactant and the second surfactant are different.

15. The method according to claim 14, wherein the first surfactant and the second surfactant are selected from the group consisting of: deoxycholates, sulfates, cholates, sulfonates, phosphates, phosphonates, carboxylates, and any combinations thereof.

16. The method according to claim 13, wherein the cellulose is cotton.

17. The method according to claim 13, wherein the nitrogen content in the nitrated cellulose is from 2 to 12 wt %.

18. The method according to claim 13, wherein the M-CNTs and S-CNTs are single-walled CNTs.

19. The method according to claim 13, wherein the dispersing solution comprises one or more anionic surfactants.

20. The method according to claim 19, wherein the anionic surfactants are selected from the group consisting of: cholate, deoxycholates, sulfates, sulfonates, phosphates, phosphonates, carboxylates, and any combinations thereof.

* * * * *